US006736323B2

(12) United States Patent
Hochgesang et al.

(10) Patent No.: US 6,736,323 B2
(45) Date of Patent: May 18, 2004

(54) KEYBOARD, PREFERABLY FOR CASHIER REGISTERS

(75) Inventors: Gerhard Hochgesang, Bad Neustadt/Saale (DE); Klaus Schmoeger, Bad Neustadt/Saale (DE); Michael Martin, Heustreu (DE); Manfred Schreiber, Heustreu (DE)

(73) Assignee: Preh-Werke GmbH & Co., KG, Saale (DE)

( * ) Notice: Subject to any disclaimer, the term of this patent is extended or adjusted under 35 U.S.C. 154(b) by 91 days.

(21) Appl. No.: 09/902,539

(22) Filed: Jul. 11, 2001

(65) Prior Publication Data

US 2002/0056748 A1 May 16, 2002

(30) Foreign Application Priority Data

Jul. 14, 2000 (DE) ........................................ 100 34 346

(51) Int. Cl.[7] .................................................. G06K 7/04

(52) U.S. Cl. .......................... 235/475; 341/22; 361/680

(58) Field of Search .......................... 235/475; 341/22; 361/680

(56) References Cited

U.S. PATENT DOCUMENTS

| | | | | | |
|---|---|---|---|---|---|
| 4,564,751 | A | * | 1/1986 | Alley et al. | 235/146 |
| 5,153,589 | A | * | 10/1992 | Heys et al. | 341/22 |
| 5,510,953 | A | * | 4/1996 | Merkel | 361/680 |
| 5,661,633 | A | * | 8/1997 | Patret | 361/683 |
| 5,865,546 | A | * | 2/1999 | Ganthier et al. | 400/489 |
| 5,966,284 | A | * | 10/1999 | Youn et al. | 361/680 |
| 6,104,604 | A | * | 8/2000 | Anderson et al. | 361/680 |
| 6,312,175 | B1 | * | 11/2001 | Lum | 400/472 |
| 6,317,061 | B1 | * | 11/2001 | Batra et al. | 341/22 |
| 6,421,237 | B1 | * | 7/2002 | Kim | 361/686 |
| 6,497,368 | B1 | * | 12/2002 | Friend et al. | 235/472.01 |
| 6,510,048 | B2 | * | 1/2003 | Rubenson et al. | 361/680 |

FOREIGN PATENT DOCUMENTS

| | | |
|---|---|---|
| CA | 2051503 | 3/1993 |
| DE | 3105973 | 1/1982 |
| DE | 29510328 | 11/1995 |
| DE | 19638206 | 4/1998 |
| DE | 19639489 | 4/1998 |
| DE | 29918153 | 2/2000 |
| EP | 0397095 | 11/1990 |
| EP | 0863477 | 9/1998 |
| JP | 05046649 | 2/1993 |
| JP | 11031275 | 2/1999 |
| JP | 11031276 | 2/1999 |
| JP | 11031277 | 2/1999 |

* cited by examiner

*Primary Examiner*—Thien M. Le
*Assistant Examiner*—Daniel A. Hess
(74) *Attorney, Agent, or Firm*—Birch, Stewart, Kolasch & Birch, LLP

(57) ABSTRACT

A keyboard housing is built of one piece of material, with the keyboard housing being formed of an upper housing shell and a joining S-shaped lower housing shell. In this regard, the keyboard housing is preferably of resinous plastic. The keypad and, for example, the keyboard electronic circuitry are contained in the upper housing shell, with the auxiliary components being the lower housing shell.

12 Claims, 3 Drawing Sheets

KEYBOARD, PREFERABLY FOR CASHIER REGISTERS

This nonprovisional application claims priority under 35 U.S.C. § 119(a) on Patent Application No. DE 100 34 346.5 filed in Germany on Jul. 14, 2000, which is herein incorporated by reference.

BACKGROUND OF THE INVENTION

1. Field of the Invention

The present invention relates to a keyboard, preferably for cashier registers.

2. Description of the Background Art

Known keyboards have a plurality of keyboard housing parts so that, when they are serviced, exchanged or refurbished the keypad, and also often the associated keyboard electronic circuitry, must be taken out of the keyboard housing in order to replace defective, or to integrate additional, auxiliary components in the keyboard or the keyboard housing.

A keyboard for computers, for example for Point-of-Sale (POS) terminals, is disclosed in Canadian patent CA 2,051,503. Therein, a keyboard housing is of a plurality of parts.

A keyboard with a magnetic-card reader and a chip-card reader is disclosed in Japanese Abstract JP-Ab-05046649 A. Various embodiments of a compact keyboard housing are described in Japanese Abstracts JP-Ab-11031275 A, JP-Ab-11031276 A as well as JP-Ab-11031277 A.

Further keyboards can be seen in European Patent EP 0 397 095 A2 as well as in German patent document DE 31 05 973 A1.

In German patent document DE 196 39 489 A1 the function of a POS terminal is described.

A keypad, preferably for cashier registers, is disclosed in German patent document DE 196 38 206 A1.

Each of the above-mentioned keyboards has multi-part housings and accordingly does not have a sufficiently flexible structure along with a high service friendliness as is currently required in the field of data input.

SUMMARY OF THE INVENTION

It is therefore an object of the present invention to provide a keyboard that is structured so as to be fabrication and service-friendly.

According to principles of this invention, a keyboard housing is made of one piece of material, with the housing being formed of an upper housing shell and an S-shaped lower housing shell joined with the upper housing shell. In addition, the housing is preferably made of resinous plastic. A keypad and, for example, keyboard electronic circuitry are contained in the upper housing shell and additional components in the lower shell. The keypad is preferably supported at points. In this regard, the keypad lies on sleeves in the upper housing shell in which, preferably, two screws engage for positioning and attaching the keypad in the upper housing shell.

The keyboard electronic circuitry is, for example, below the keypad and is also supported at points, with plug couplings of the keyboard electronic circuitry extending into the lower housing shell.

The additional electrical components, such as, for example, an electronic circuit of a magnetic-card reader and/or a chip-card reader, a joystick, are coupled with the keyboard electronic circuitry.

The lower housing shell has a screw-on cover for covering it. On a backside of the lower housing shell, that is directed toward the top, a slot-shaped guide for the magnetic-card reader is integrated into the housing for having a magnetic card pulled therethrough.

Preferably, additionally or alternatively, a slot-like receiver opening for receiving a chip card can also be provided in this area.

An advantage of this solution is that additional components can be plugged, attached and/or exchanged without changing the keypad or the keyboard electronic circuitry. Also, a better renovation or retrofit with further modules or components is assured. Because of this design, the structure of the keyboard is extremely compact, modular and service-friendly.

A further advantage lies in the point-like, preferably slanted, supports of the keypad and the key electronic circuitry. Penetrating moisture is trapped in the upper housing shell and can flow out through slots in the upper housing shell without reaching the keypad or the keyboard electronics.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
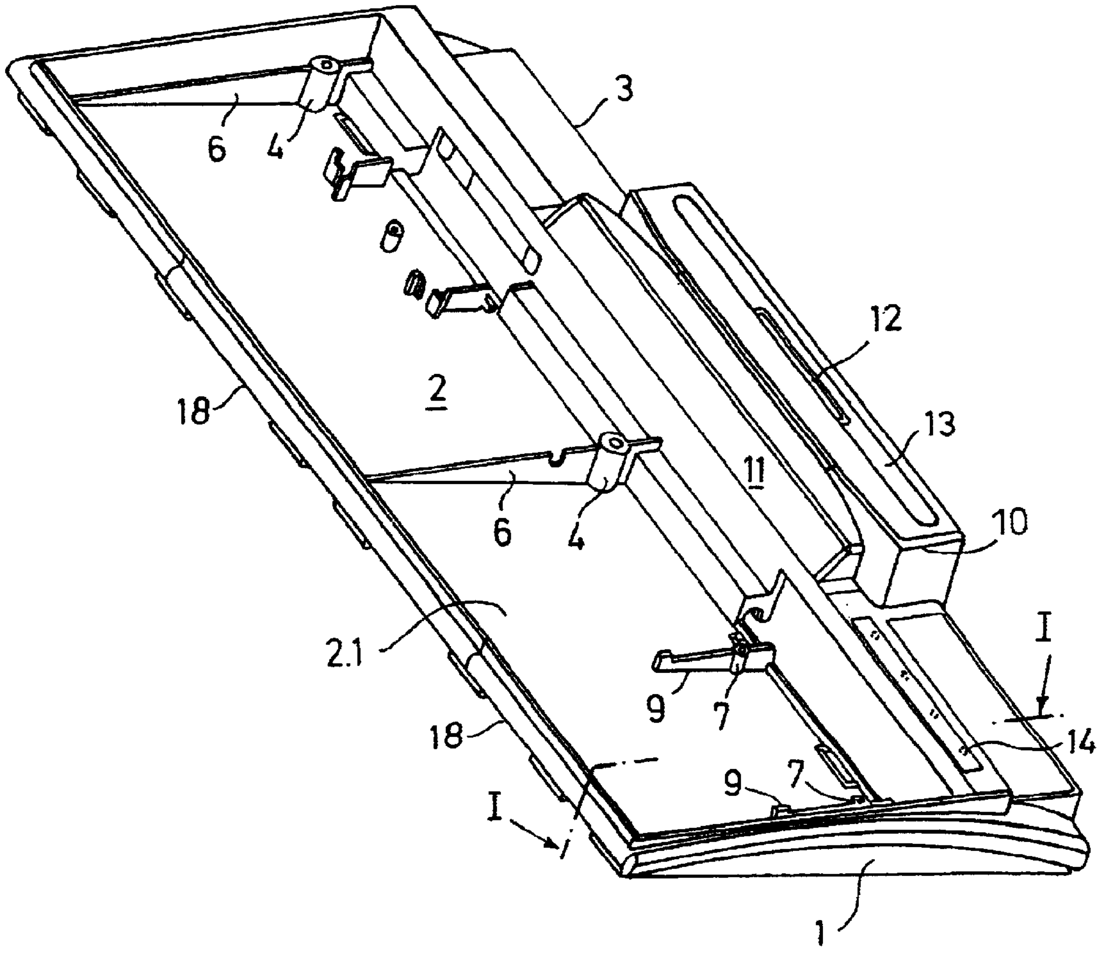
FIG. 1 is a perspective top view of a keyboard housing.

FIG. 1 shows a perspective view of a keyboard housing 1 of a keyboard 20, for example a data cashier register for a Point-of-Sale (POS) terminal, from a top view. The keyboard housing 1 is formed as a one-piece piece base body, defining an upper housing shell 2 joined with an S-shaped lower housing shell, which is not recognizable in this drawing. The upper housing shell 2 preferably has three sleeves 4 with which a keypad 5 not shown in detail here is point-supported. The keypad 5 is positioned on the sleeves 4 by screws that are not shown in detail here and are attached in the upper housing shell 2. Preferably, for a stable mechanical supporting of the keypad 5, inclined members 6 are joined on the sleeves 4, on which the keypad 5 lies at an incline.

Further sleeves 7 receive keyboard electronic circuitry 8 that is mounted below the keypad 5. Also here a mechanical support is provided by inclined members 9 that are matched with the keyboard electronic circuitry 8.

A lower side 2.1 of the upper housing shell 2 is structured to be planar at an imaginary support surface for the keyboard housing 1.

The upper housing shell 2 is joined with a backside 3.1 of the lower housing shell 3. In the lower housing shell 3, preferably in the middle, there is a rising 3.2 that, as seen from the lower housing shell 3, is actually a depression. The rising 3.2 defines a slot-shaped guide 10 of a magnetic-card reader 11 and/or a perpendicular slot-shaped opening 12 of a chip-card reader 13.

Function displays 14 of the keyboard 20 are preferably mounted adjacent the rising 3.2.

Figure 2:
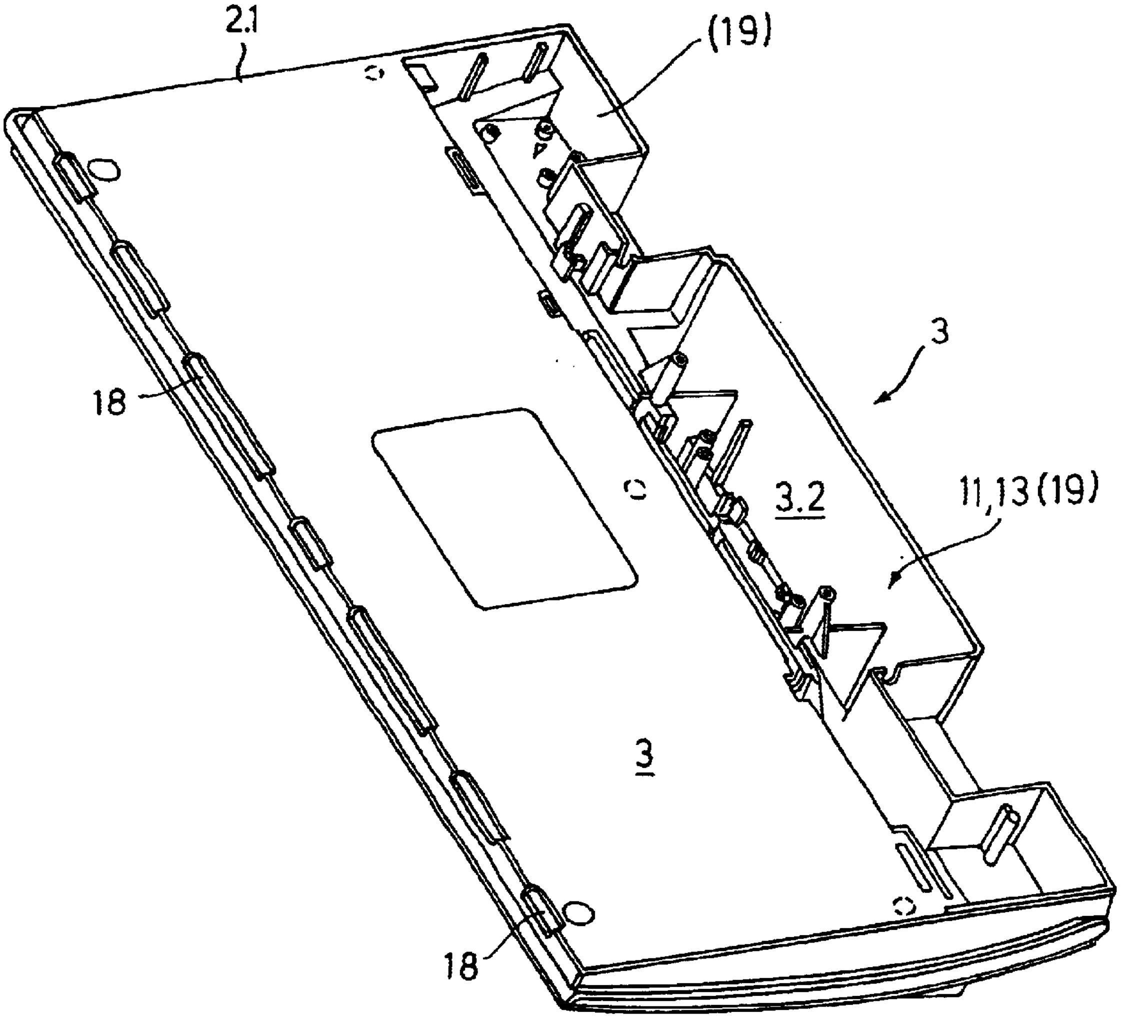
FIG. 2 is a perspective view of the underside of the keyboard housing.

The structure of the lower housing shell 3 is shown in perspective in FIG. 2. The lower housing shell 3 can preferably be subdivided into three areas and has in the middle thereof the depression, which can be seen from below. Auxiliary electrical components 19 can be mechanically attached in each area, for example, for the magnetic-card reader or the chip-card reader, with electronic coupling taking place via plug couplings 15 that extend from the upper housing shell 2 into the lower housing shell 3. The lower housing shell 3 is closed by a cover 16, as is shown in FIG. 3.

Figure 3:
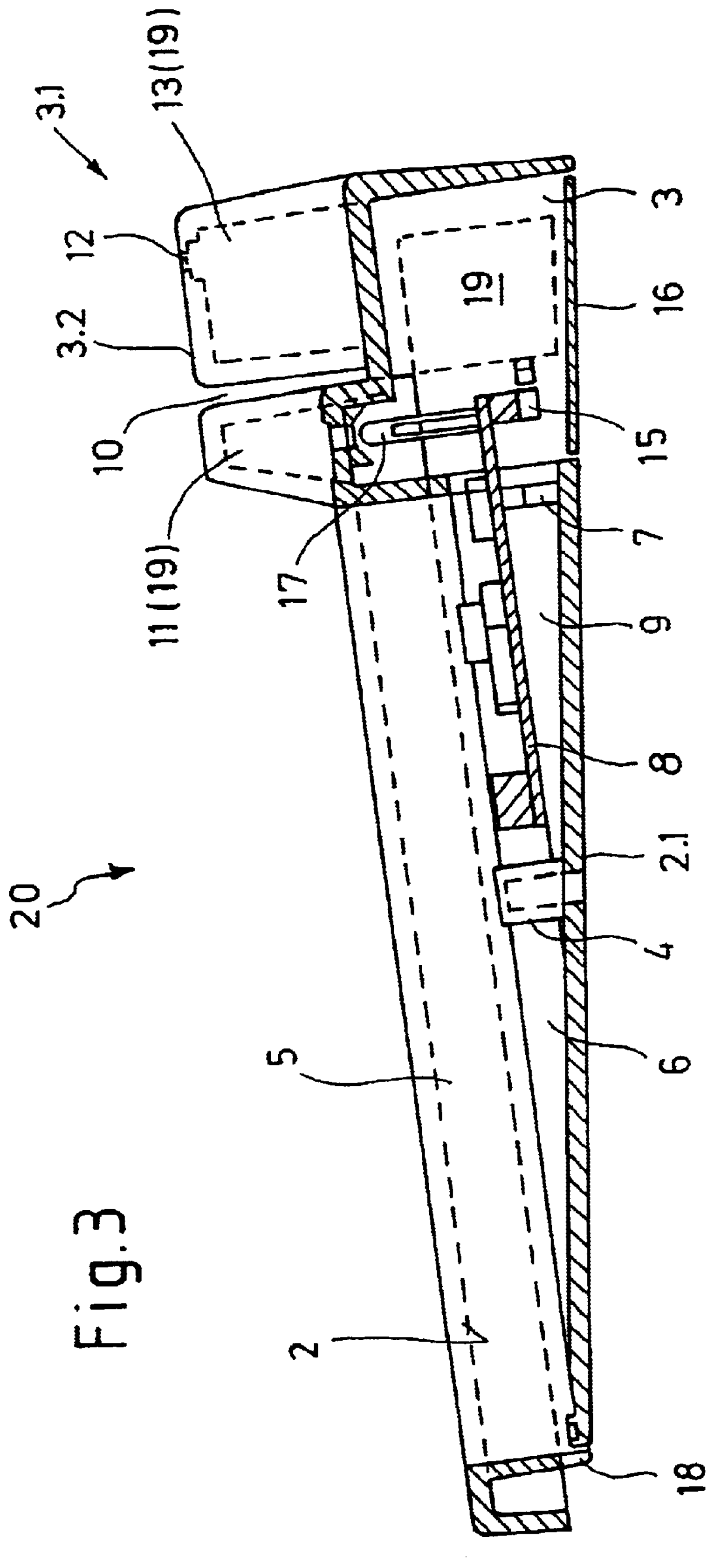
FIG. 3 is a cross sectional view of the keyboard housing taken on Line I—I in FIG. 1.

That the keyboard housing 1 of the keyboard 20 is made as one piece of material is shown in the cross-sectional view of FIG. 3. In particular, the inclined support of the keypad 5, shown here in dashed lines, can be clearly seen. The keyboard electronic circuitry 8 is positioned below the keypad 5 with its couplings 15 extending into the lower housing shell 3. LED's 17 extend from the keyboard electronic circuitry 8 into the area of the function displays 14. There are additional slots 18 in the front edge of the upper housing shell 2. Entering moisture can again exit from the upper housing shell 2 through these.

The keyboard housing 1 is preferably a resinous plastic injection-molded piece. The cover 16, preferably, is of metal or of the same material and is screwed onto the keyboard housing 1.

It should be understood that modifications are possible within the scope of this invention. For example, the lower housing shell 3 can join the upper housing shell 2 at the side so that the slot-shaped guide 10 of the magnetic-card reader 11 and/or the insert opening 12 of the chip-card reader 13 can be at the side of the keypad 5.

What is claimed is:

1. A keyboard comprising:

a housing for receiving:
- a keypad;
- associated keyboard electronic circuitry; and
- at least one card reader, with a slot for guiding a card, along with auxiliary components, wherein the housing is formed of one piece of material thereby forming an upper housing shell and an S-shaped lower housing shell whose backside joins the upper housing shell seamlessly, and wherein the upper housing shell supports the keypad and the keyboard electronic circuitry and the lower housing shell contains the auxiliary components that are electrically coupled via plug couplings with the keyboard electronic circuitry, the plug couplings extending from the upper housing shell into the lower housing shell.

2. The keyboard according to claim 1, wherein a backside of the lower housing shell has a rising into which a magnetic-card reader comprising at least one card reader is integrated, the backside defining the slot as a slot-shaped guide for guiding the magnetic card.

3. The keyboard according to claim 1, wherein a backside of the lower housing shell has a rising into which a chip-card reader, comprising at least one card reader is integrated, the backside defining the slot as a slot-shaped opening for guiding a chip card in this area.

4. The keyboard according to claim 1, wherein the backside of the lower housing shell has a rising into which a magnetic-card reader and a chip-card reader are integrated, with the backside forming the slot as a slot-shaped guide for guiding a magnetic card and a slot-shaped receptacle opening for guiding a chip card.

5. The keyboard according to claim 1, wherein the keypad is point-supported in the upper housing shell by sleeves and is releasably attached to the keyboard housing.

6. The keyboard according to claim 1, wherein the keyboard electronic circuitry is releasably attached in the upper housing shell below the keypad via further sleeves.

7. The keyboard according to claim 1, wherein the lower housing shell is closed by a cover.

8. The keyboard according to claim 1, wherein the keyboard housing is a resinous-plastic injection-molded part.

9. The keyboard according to claim 1, wherein the keyboard is for a cashier register.

10. The keyboard according to claim 9, wherein the cashier register is a point of sale terminal.

11. A keyboard housing comprising:

an upper shell portion having inclined members for receiving a keypad thereon such that the keypad is inclined during operation thereof;

a lower shell portion for attachably receiving additional electrical components;

a cover removably fixed to the lower shell portion; and a rising portion formed as a slot-shaped guide for a magnetic-card reader or a chip-card reader, wherein the upper shell portion, the lower shell portion and the rising are integrally molded such that the keyboard housing is formed as one-piece.

12. The keyboard housing according to claim 11, wherein the keyboard housing formed substantially in an S-shape.

* * * * *